United States Patent [19]

Clark

[11] 4,201,759

[45] May 6, 1980

[54] METHOD FOR REGENERATING CALCIUM SULFOXY COMPOUNDS PRODUCED IN THE COMBUSTION OF CARBONACEOUS FUELS IN FLUIDIZED BEDS

[75] Inventor: William E. Clark, Bethel Park, Pa.

[73] Assignee: Continental Oil Company, Stamford, Conn.

[21] Appl. No.: 966,544

[22] Filed: Dec. 5, 1978

[51] Int. Cl.² .............................................. C01B 17/02
[52] U.S. Cl. .................................. 423/567 A; 423/244;
423/356; 423/431; 423/512 A; 423/562;
423/563; 423/571
[58] Field of Search ............... 423/244, 356, 431, 519,
423/520, 548, 561 R, 555, 561 A, 562, 563, 571,
512 A, 567 A, 165

[56] References Cited

U.S. PATENT DOCUMENTS

| | | | |
|---|---|---|---|
| 1,902,649 | 3/1933 | Larsson | 423/548 |
| 2,722,473 | 11/1955 | Toland, Jr. | 423/563 |
| 2,928,718 | 3/1960 | Berglund | 423/555 |
| 3,714,338 | 1/1973 | Urban | 423/571 |
| 3,989,809 | 11/1976 | Stauffer | 423/356 |

FOREIGN PATENT DOCUMENTS 876,442 8/1961 United Kingdom ..................... 423/356

Primary Examiner—Earl C. Thomas
Attorney, Agent, or Firm—William A. Mikesell, Jr.; F. Lindsey Scott

[57] ABSTRACT

In methods for combusting carbonaceous sulfur-containing fuels in a fluidized bed wherein the fluidized bed contains at least one calcium compound selected from the group consisting of calcium oxide, calcium hydroxide, calcium carbonate and calcium bicarbonate to absorb sulfur oxides formed during the combustion of the carbonaceous fuel thereby producing calcium sulfoxy compounds having the formula $CaSO_x$ wherein x is 3 or 4, an improvement comprising (a) withdrawing a stream of fluidized bed solids containing said calcium sulfoxy compounds and mixing the fluidized bed solids and said calcium sulfoxy compounds with water to produce a slurry; (b) reacting the $CaSO_x$ compounds with $NH_3$, $H_2O$ and $CO_2$ to produce water-soluble ammonium sulfoxy compounds such as $NH_4(HSO_x)$ where x is 3 or 4 and $CaCO_3$; and (c) separating the ammonium sulfoxy compounds from the fluidized bed solids and $CaCO_3$.

5 Claims, 2 Drawing Figures

METHOD FOR REGENERATING CALCIUM SULFOXY COMPOUNDS PRODUCED IN THE COMBUSTION OF CARBONACEOUS FUELS IN FLUIDIZED BEDS

This invention relates to methods for regenerating calcium compounds used in the absorption of sulfur oxides in fluidized beds.

In recent years, there has been in increasing interest in the combustion of sulfur-containing carbonaceous fuels to produce electricity, heat and the like. As a result of the continuing combustion of such fuels, the environment has been increasingly polluted with sulfur oxides produced during the combustion of such fuels. One method proposed for eliminating or reducing the amount of sulfur oxides escaping into the atmosphere with the flue gases has been the use of fluidized beds for the combustion of such carbonaceous fuels. The fluidized beds contain calcium compounds such as calcium oxide, calcium hydroxide, calcium carbonate, calcium bicarbonate and the like to absorb sulfur oxides formed during the combustion of the carbonaceous fuel. The hot gases so produced are used to heat boiler tubes or other means for transferring heat to a desired application. The transfer of heat can be in the fluidized bed itself or from the gases to heat exchangers of various types. Numerous such variations and modifications are known to the art and form no part of the present invention.

The present invention comprises an improvement whereby a stream of fluidized bed solids containing calcium sulfoxy compounds of the general formula $CaSO_x$ where x is 3 or 4 is withdrawn from the fluidized bed and mixed with water to produce a slurry. The $CaSO_x$ compounds are then reacted with $NH_3$, $H_2O$, and $CO_2$ to produce water-soluble ammonium sulfoxy compounds such as $NH_4(HSO_x)$ and $NH_4(SO_x)_2$ wherein x is 3 or 4 and $CaCO_3$. The ammonium sulfoxy compounds are water-soluble and are readily separated from the $CaCO_3$ and fluidized bed solids by filtration, decantation or the like. The ammonium sulfoxy compounds are then passed to regeneration to produce sulfur or the like. Such water-soluble ammonium sulfoxy compounds are referred to hereinafter as $NH_4(HSO_x)$.

In the discussion of the FIGS., the same numbers will be reused throughout to refer to the same or similar components.

Figure 1:
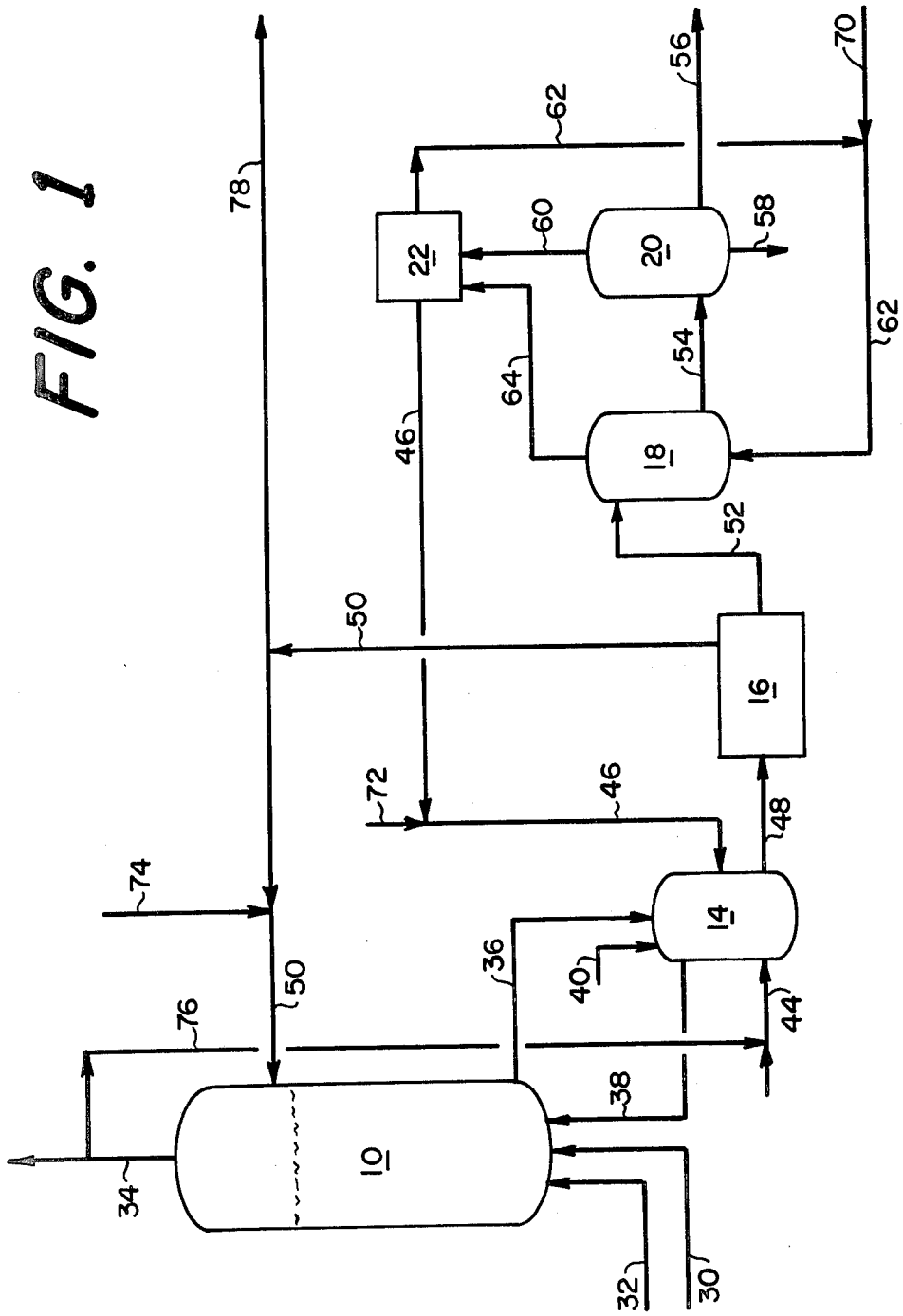
FIG. 1 is a schematic diagram of a process embodying the improvement of the present invention.

In FIG. 1, a combustion vessel 10 is shown. Vessel 10 contains a fluidized bed of coal, optionally in mixture with inerts, finely divided solids, or the like. The term "fluidized" as used herein refers to fully fluidized beds, ebullated beds and beds in which finely divided solids are agitated by an upwardly flowing fluid or gaseous medium. Finely divided coal is introduced into vessel 10 via a line 30 and oxygen is introduced into vessel 10 via a line 32. The oxygen may be introduced as air, oxygen-enriched air, pure oxygen or the like. Fluidized bed solids and calcium carbonate are recycled to vessel 10 via a line 50 and flue gas is exhausted from vessel 10 via a line 34. A stream of fluidized bed solids and calcium sulfoxy compounds is withdrawn from vessel 10 via a line 36 and passed to a reactor 14. Water is added through a line 40 and the aqueous slurry is reacted with carbon dioxide introduced through a line 44 and ammonia introduced through a line 46. Vent gases from vessel 14 optionally pass from reactor 14 to vessel 10 through a line 38. The $CO_2$ requirement in vessel 14 may be supplied completely or in part from vessel 10 off-gases via line 76. The reaction products from vessel 14 which comprise $NH_4(HSO_x)$ and calcium carbonate are passed through a line 48 to a filter 16 (or other solid-liquid separation devices known to the art) where the calcium carbonate is separated from the aqueous stream containing the $NH_4(HSO_x)$. The calcium carbonate and the fluidized bed solids are recycled through line 50 to vessel 10.

In some instances, it may be desirable to separate the calcium sulfoxy compounds from any accompanying unburned coal or coal ash before application of the process herein described or to separate the unburned coal and ash from the regenerated calcium carbonate after application of the process. Such separations may be effected by differences in physical properties such as density by means known to those skilled in the art and form no part of the present invention. Similarly, it may be desirable to dry the regenerated calcium carbonate before returning it to the fluidized bed and such treatment, also well known to those skilled in the art, forms no part of the present invention. Unreactive solids are removed from the system through a line 78 and make-up calcium oxide, calcium hydroxide or calcium carbonate is added via a line 74. The aqueous solution containing the $NH_4(HSO_x)$ is passed through a line 52 to a reactor 18 where it is contacted with hydrogen sulfide supplied via a line 62 to produce ammonium polysulfide. A line 64 is shown as a vent from vessel 18 to a separation zone 22. The aqueous slurry of ammonium polysulfide is passed through a line 54 to a reactor 20 where it is thermally decomposed to produce ammonia, hydrogen sulfide and elemental sulfur. The elemental sulfur is recovered through a line 58 with the water being recovered through a line 56. All or a portion of the water may be recycled to vessel 14. The ammonia and hydrogen sulfide are recovered via a line 60 and passed to an $NH_3/H_2S$ separator 22 from which $H_2S$ is recovered through a line 62 and recycled to reactor 18 with the ammonia being recovered through a line 46 and recycled to vessel 14. Additional $H_2S$ may be supplied to reactor 18 via line 70 and additional $NH_3$ to reactor 14 via line 72.

Figure 2:
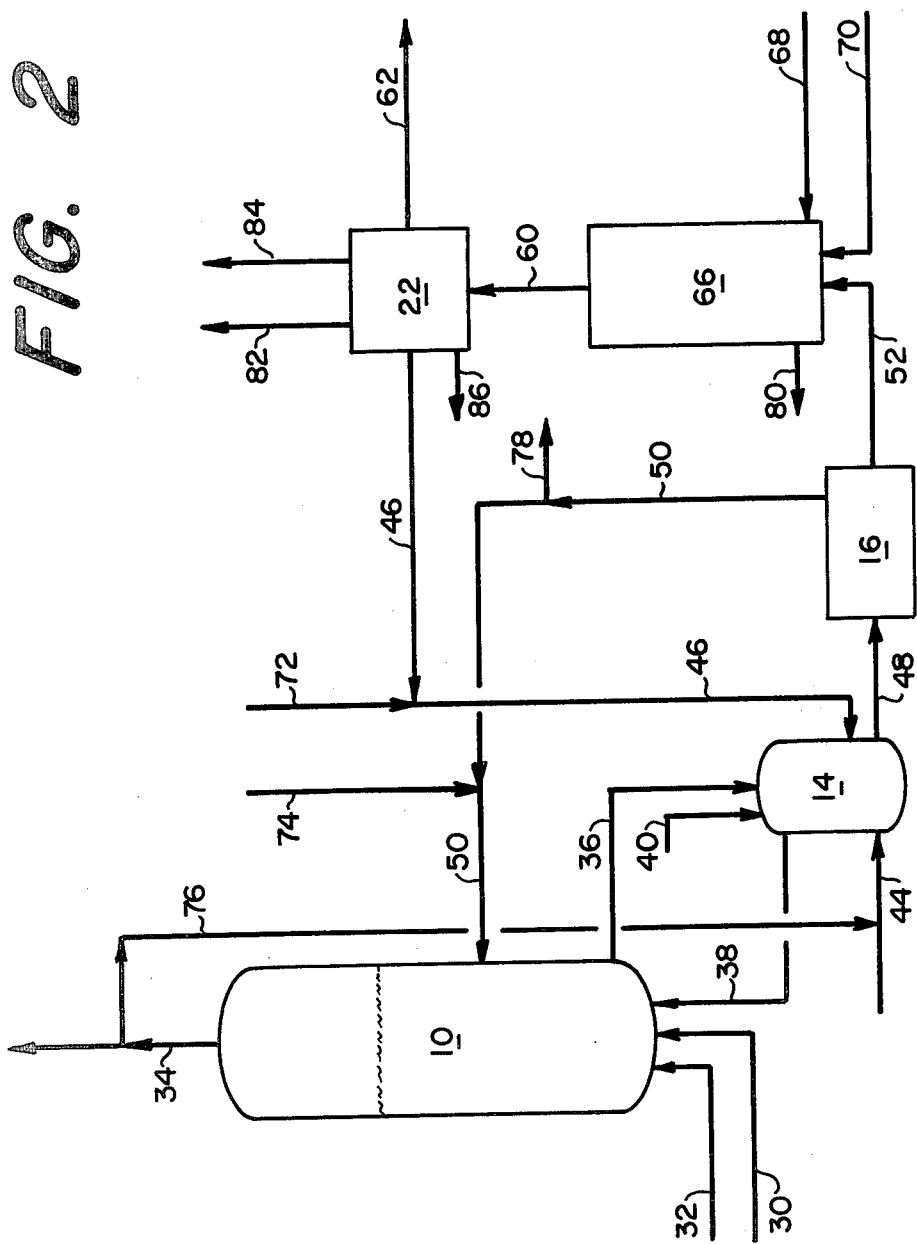
FIG. 2 is a schematic diagram of a further embodiment of the improvement of the present invention.

In FIG. 2, a further embodiment of the improvement of the present invention is set forth. The stream flowing through line 52 which comprises an aqueous solution of $NH_4(HSO_x)$ is passed to a vessel 66 which desirably comprises an ebullated bed of coal or other carbonaceous solids. Char or partially burned residue from vessel 10 are examples of such carbonaceous solids. Liquid carbonaceous fuels can also be used, but it is preferred that solid carbonaceous fuels be used because of the ready availability of such fuels at sites where fluidized combustion of coal or the like is practiced. Fuel is introduced into vessel 66 via a line 68, and oxygen via a line 70. The oxygen may be introduced in the form of air, oxygen-enriched air, pure oxygen or the like. Desirably, the oxygen is introduced in quantities sufficient to maintain the temperature in reaction vessel 66 at a desired level. The oxygen serves to combust a portion of the carbon present to carbon dioxide or the like thereby generating heat and allowing control of the temperature in vessel 66. As indicated previously, vessel 66 is desirably an ebullated bed or the like. Combustion residue is removed via a line 80. The gaseous mixture so produced is recovered through a line 60 and passed to ammonia and hydrogen sulfide separation zone 22. Hydrogen sulfide is recovered via a line 62 and passed to sulfur recovery or the like with ammonia and carbon dioxide being recovered through a line 46 and recycled to vessel 14. The hydrogen sulfide is desirably processed to more valuable products by means known to those skilled in the art. Any excess carbon dioxide is shown leaving zone 22 via a line 84 and may be sent to a stack or to line 34. Condensed water is recovered via a line 86 and may be used as make-up for vessel 14 or the like. The heating value of components such as H$_2$ and CO entering zone 22 via line 60 may be sufficient to warrant recovery. Any such recovered heating values are shown leaving zone 22 via a line 82. Such combustibles could be conveniently used as fuel in either vessel 10 or vessel 66.

The use of fluidized combustion zones for the combustion of sulfur-containing fuels such as coal and the like, as indicated previously, is of considerable interest and, while the use of calcium compounds in such beds to absorb sulfur oxides has been known heretofore, it has previously been considered necessary to withdraw and discard a portion of the fluidized bed solids in order to dispose of the calcium sulfoxy compounds so produced. By the method of the present invention, such calcium sulfoxy compounds are readily converted to calcium carbonate which is readily recycled to the fluidized bed with the sulfur components being recovered as desirable byproducts. Further, the improvement of the present invention utilizes only coal as an additional raw material thereby resulting in the production of a desirable byproduct and eliminating a disposal problem with respect to the calcium sulfoxy solids produced by the absorption of sulfur oxides.

Calcium sulfoxy compounds of the general formula CaSO$_x$ wherein x is 3 or 4 are reacted with ammonia, water, and carbon dioxide to produce water-soluble ammonium sulfoxy compounds wherein x is 3 or 4 according to equation (1), for example, below:

$$CaSO_x + NH_3 + CO_2 + H_2O \rightarrow NH_4(HSO_x) + CaCO_3 \quad (1)$$

The calcium carbonate so produced is substantially insoluble in water and precipitates for ready recovery with the fluidized bed solids on filter 16 for recycle. Other solid/liquid separation processes known to those skilled in the art may be used if desired. The ammonium sulfoxy compounds are relatively water-soluble and are passed through line 52 to vessel 66 with the aqueous stream. While reference has been made to NH$_4$HSO$_x$ herein as a water-soluble ammonium sulfoxy salt, it is noted that other water-soluble ammonium sulfoxy salts such as NH$_4$(SO$_x$)$_2$ and the like may also be present in such aqueous solutions as is known to those skilled in the art. Such salts may be considered the equivalent of NH$_4$(HSO$_x$) since they are typically present and since, in general, they behave the same chemically in the reactions of interest. In vessel 66, the NH$_4$(HSO$_x$) compounds are reacted with carbon according to equation (2), for example, below:

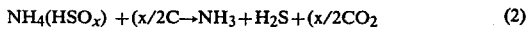

$$NH_4(HSO_x) + (x/2)C \rightarrow NH_3 + H_2S + (x/2)CO_2 \quad (2)$$

The reaction conditions in reactor 66 are a temperature from about 1200° to about 1600° F. and preferably a temperature from about 1300° to about 1500° F. The pressure in vessel 66 is desirably from about 0 to about 250 p.s.i.g. and preferably from about 50 to about 100 p.s.i.g. The separation of the ammonia and hydrogen sulfide from the gaseous stream is accomplished in separation zone 22 by means known to those skilled in the art. Separation of ammonia and hydrogen sulfide from water condensed in separation zone 22 may be, for example, by means such as set forth in "Sour-Water Processing Turns Problem into Payout", R. J. Annessen and G. D. Gould, Chemical Engineering, Mar. 22, 1971, pp. 67–69. The hydrogen sulfide may be removed from the gas stream and converted rather directly to sulfur by means of processes such as the Stretford process. Alternatively, the hydrogen sulfide may be removed and recovered as H$_2$S by one of the common acid gas removal processes such as the hot potassium carbonate process. Essentially NH$_3$, H$_2$S and CO$_2$ are removed by combinations of such processes leaving the combustibles and inerts for separate disposal. Such separation techniques form no part of the present invention and need not be discussed further.

With respect to the embodiment set forth in FIG. 1, the NH$_4$HSO$_x$ and (NH$_4$)$_2$SO$_x$ are reacted with H$_2$S at a temperature from about 300° to about 600° F. and a pressure from about 150 to about 2000 p.s.i.g. to produce ammonium polysulfide which is thermally decomposed in reactor 20 to produce elemental sulfur, hydrogen sulfide and ammonia at a temperature from about 200° to about 300° F.

By the improvement of the present invention, it is now possible to regenerate the calcium sulfoxy compounds produced by the combustion of sulfur-containing carbonaceous fuels in fluidized beds thereby producing a recyclable calcium carbonate compound for reuse in the absorption of sulfur oxides. Further, the practice of the improvement of the present invention results in the production of desirable byproducts and eliminates the need for the disposal of quantities of calcium sulfoxy compounds as a waste stream.

Having thus described the present invention by reference to certain of its embodiments, it is respectively pointed out that the embodiments described are illustrative rather than limiting in nature and that many variations and modifications are possible within the scope of the present invention. Many such variations and modifications may be considered obvious and desirable by those skilled in the art upon a review of the foregoing description of preferred embodiments.

Having thus described the invention, I claim:

1. In a method for combusting carbonaceous sulfur-containing fuels in a fluidized bed wherein said fluidized bed contains at least one calcium compound selected from the group consisting of CaO, Ca(OH)$_2$, CaCO$_3$ and Ca(HCO$_3$)$_2$ to absorb sulfur oxides formed during combustion of said carbonaceous fuel to produce calcium sulfoxy compounds having the general formula CaSO$_x$ wherein x is 3 or 4 the improvement comprising:
   (a) withdrawing a stream of fluidized bed solids containing said CaSO$_x$ and mixing said fluidized bed solids with water to produce a slurry;
   (b) reacting said CaSO$_x$ in said slurry with NH$_3$, H$_2$O and CO$_2$ to produce watersoluble ammonium sulfoxy compounds and CaCO$_3$;
   (c) separating said water-soluble ammonium sulfoxy compounds from said fluidized bed solids and said CaCO$_3$;

(d) recycling at least a portion of said $CaCO_3$ to said fluidized bed.

(e) reacting said water-soluble ammonium sulfoxy compounds with $H_2S$ at a temperature from about 300° to about 600° F. and a pressure from about 150 to about 2000 psig to produce ammonium polysulfide;

(f) thermally decomposing said ammonium polysulfide at a temperature from about 200° to about 300° F. to produce $NH_3$, $H_2S$ and sulfur;

(g) recycling said $NH_3$ to step (b) to the reaction of said $CaSO_x$ with $NH_3$, $H_2O$ and $CO_2$;

(h) recycling said $H_2S$ to step (e) to the reaction of said water-soluble ammonium sulfoxy compounds with $H_2S$; and, (i) recovering at least a portion of said sulfur.

2. The improvement of claim 1 wherein said water-soluble ammonium sulfoxy compounds comprise at least one of $NH_4HSO_x$ and $NH_4(SO_x)_2$ where x is 3 or 4.

3. In a method for combusting carbonaceous sulfur-containing fuels in a fluidized bed wherein said fluidized bed contains at least one calcium compound selected from the group consisting of $CaO$, $Ca(OH)_2$, $CaCO_3)_2$ to absorb sulfur oxides formed during combustion of said carbonaceous fuel to produce calcium sulfoxy compounds having the general formula $CaSO_x$ wherein x is 3 or 4 the improvement comprising:

(a) withdrawing a stream of fluidized bed solids containing said $CaSO_x$ and mixing said fluidized bed solids with water to produce a slurry;

(b) reacting said $CaSO_x$ in said slurry with $NH_3$, $H_2O$ and $CO_2$ to produce water-soluble ammonium sulfoxy compounds and $CaCO_3$; and (c) separating said water-soluble ammonium sulfoxy compounds from said fluidized bed solids and said $CaCO_3$;

(d) recycling at least a portion of said $CaCO_3$ to said fluidized bed;

(e) reacting said water-soluble ammonium sulfoxy compounds with a carbonaceous solid at a temperature from about 1200° to about 1600° F. and a pressure from about 0 to about 250 psig to produce $NH_3$, $H_2S$ and carbon oxides; and, (f) recycling said $NH_3$ to step (b) to the reaction of said $CaSO_4$ with $NH_3$, $H_2O$ and $CO_2$.

4. The improvement of claim 3 wherein said $H_2S$ is passed to sulfur recovery.

5. The improvement of claim 3 wherein said water-soluble ammonium sulfoxy compounds comprise at least one of $NH_4HSO_x$ and $NH_4(SO_x)_2$ wherein x is 3 or 4.

* * * * *

UNITED STATES PATENT AND TRADEMARK OFFICE
CERTIFICATE OF CORRECTION

PATENT NO. : 4,201,759
DATED : May 6, 1980
INVENTOR(S) : William E. Clark

It is certified that error appears in the above—identified patent and that said Letters Patent is hereby corrected as shown below:

Column 3, line 64 should read:

$$NH_4(HSO_x) + x/2C \rightarrow NH_3 + H_2S + x/2CO_2 \qquad (2)$$

Column 5, line 25 should read:

from the group consisting of CaO, Ca(OH)$_2$, CaCO$_3$ and Ca(HCO$_3$)$_2$

Signed and Sealed this

Fifteenth Day of July 1980

[SEAL]

Attest:

SIDNEY A. DIAMOND

*Attesting Officer*     *Commissioner of Patents and Trademark*